Nov. 18, 1969  C. D. WRIGHT  3,478,675
APPARATUS FOR PRESSURIZING AIR OPERATED COFFEE BREWER
Filed June 28, 1968
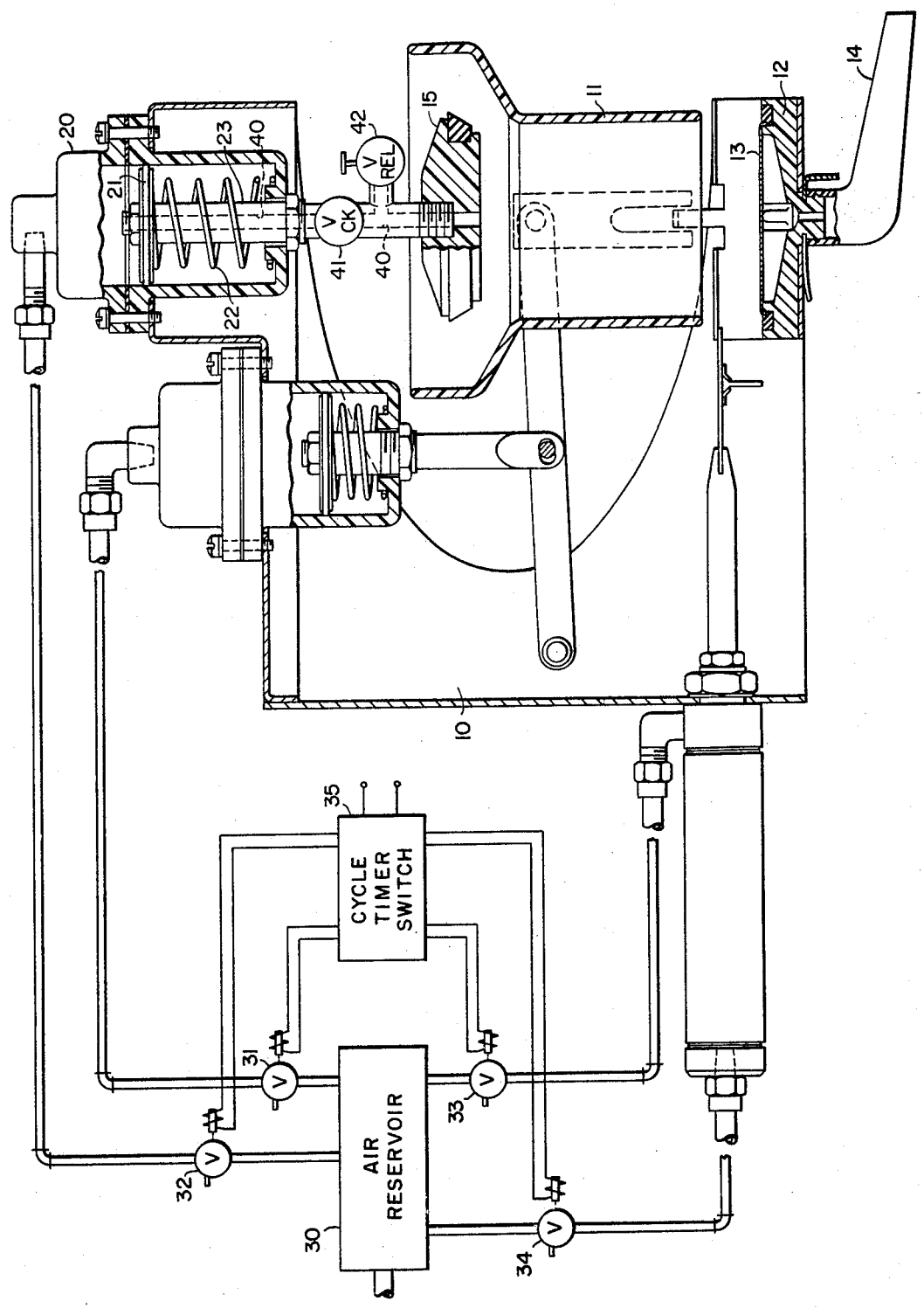

United States Patent Office 3,478,675
Patented Nov. 18, 1969

3,478,675
APPARATUS FOR PRESSURIZING AIR
OPERATED COFFEE BREWER
Charles D. Wright, Chicopee, Mass., assignor to Westinghouse Electric Corporation, Pittsburgh, Pa., a corporation of Pennsylvania
Filed June 28, 1968, Ser. No. 741,028
Int. Cl. A47j 31/32
U.S. Cl. 99—302                                    2 Claims

ABSTRACT OF THE DISCLOSURE

In an air operated coffee brewer with a movable stopper and brew cylinder together with an air cylinder having a piston and piston rod connected to the stopper to move the stopper into sealing with the brew cylinder during the brew cycle; the pressurizer for the brew cylinder comprising a bore through the piston, rod and stopper and a first pressure relief valve in the bore and a second relief valve connecting the bore to the atmosphere at a point between the first valve and the stopper.

Cross references to related patent applications

An air operated coffee brewer with which the pressurizing arrangement of the present invention may be used as described in the copending U.S. patent application 741,027 having a different arrangement for pressurizing the brew cylinder. An air operated coffee brewer having yet another arrangement for pressurizing the brew cylinder is shown in the copending U.S. patent application Ser. No. 741,026. Both of the aforementioned point applications are assigned to the same assignee as this patent application.

Background of the invention

Air operated coffee brewers of the type disclosed by the above-mentioned copending patent application Ser. No. 741,027 have a movable stopper and an air piston for moving the stopper into sealing relation with the upper open end of a brew cylinder whose lower end may be connected to a filter screen and brewed coffee outlet. In order to extract the brewed coffee through the filter screen in a given period of time known as the brewing time during the brew cycle, air under pressure is introduced into the brew cylinder while the stopper is in sealing relation thereto. If the buildup of pressure in the brew cylinder during the brewing time of the brew cycle becomes excessive, the stopper may become unseated and undesirable leakage of liquid and coffee grounds will occur around the unseated sealing surfaces of the stopper and brew cylinder. Also if the pressure buildup is excessive, the coffee will be extracted too quickly resulting in a weak flavor. One arrangement for preventing excessive air pressure in the brew cylinder during the brew cycle as disclosed in the aforementioned copending application 741,027 is to provide a separate air valve together with a pressure reducing valve in the air line to the brew cylinder. Other arrangements for pressurizing the brew cylinder without the use of a separate air valve and a pressure reducing valve are desirable in some applications where maximum economy is desired. It is also desirable to be able to adjust the maximum pressure of air within the brew cylinder in a manner to predetermine the speed with which the brewed coffee is extracted through the filter screen.

In the aforementioned copending application Ser. No. 741,026, a bore with a restriction is provided in the piston, piston rod of the air cylinder and the stopper to control the rate of flow of air supplied to the brew cylinder during the brew time of the brew cycle. This arrangement is of couse simple and economical, but in view of the fact that the size of the restriction is fixed, it cannot be easily changed and it is therefore not possible to adjust the rate of flow of air bled into the brew cylinder in a manner to adjust the speed with which the brewed coffee is extracted through the filter screen to thus influence the flavor of the coffee.

Prior art

Applicant is unaware of any prior art arrangements for pressurizing an air operated coffee brewer in a manner similar to this invention.

Summary

According to the invention, a movable stopper for an air operated coffee brewing cylinder is moved into sealing relation with the upper open end of the brew cylinder during the brew cycle by means of an air cylinder. The piston, piston rod and stopper are bored to permit air to be bled from the air cylinder into the brew cylinder while the stopper is maintained in sealing relation during the brewing portion of the cycle. A first pressure relief valve is placed in the bore and is operable to open and bleed air from the air cylinder into the brew cylinder above a predetermined pressure of air in the air cylinder sufficient to assure and maintain the movement of the stopper into sealing relation with the upper open end of the brew cylinder. A second pressure relief valve is connected to the bore and atmosphere at a point between the first pressure relief valve and the stopper to prevent the air pressure in the brew cylinder from rising above a desired amount, during the brew time of the brew cycle. In the preferred form of the invention the second pressure relief valve is adjustable to adjustably predetermine the air pressure in the brew cylinder and thus predetermine the speed of flow of the brewed coffee through the filter screen and enable the strength flavor of the coffee to be controlled.

Further objects, features and the attendant advantages of the invention will be apparent with reference to the following specification and drawing.

Brief description of the drawing

The sole figure of the drawing is a side elevational view partly in section of an air operated brewer embodying the pressurizing arrangement of the invention together with the source of air pressure, the air piping, valves and the cycle switch for controlling the electrically operated air valves.

Description of the preferred embodiment of the invention

Reference may be made to the copending patent application Ser. No. 741,027 for a more complete detailed description of an air operated coffee brewer of the type for which the pressurizing arrangement of the present invention is particularly suitable. In order to simplify the description and drawing of the present invention, only a brief description of the air operated coffee brewer as required for a full understanding of this invention will be made.

Referring to the drawing, the sheet metal frame at 10 is shown to support a movable brew cylinder 11 normally positioned to be spaced above the brewing platform 12 upon whose upper surface is a filter screen 13 overlying the brewed coffee outlet 14. A stopper 15 for the upper open end of the brew cylinder 11 is normally positioned as shown to be spaced above the upper open end of the cylinder 11 and is movable downward into sealing relation therewith when air under pressure is valved into the air cylinder 20. The air cylinder 20 includes the piston 21, the return spring 22 and piston rod 23 connected at its lower end to the stopper 15. An air reservoir 30 supplies air to the stopper operating cylinders for the brew mechanism in response to the timed operation of the respective air valves 31–34. In order to control the operation of the air valves 31–34 in the proper sequence during each brew cycle, a conventional electric motor driven cycle switch 35 is provided.

After the brew cylinder 11 has been moved into sealing relation on the platform 12 and a charge of coffee and hot water has been added to the brew cylinder, the stopper 15 is moved downward into sealing relation with the upper open end of the brew cylinder 11 and air under pressure is admitted to the interior of the brew cylinder to force the coffee and water through the filter screen 13 with a speed proportionate to the pressure of the air within the brew cylinder. In accordance with the invention, the air for pressurizing the interior of the brew cylinder 11 during the brewing portion of the brew cycle is bled from within the air cylinder 20 through a bore 40 in the piston rod 23 to a first pressure relief valve 41 to pass therefrom through the stopper 15 into the brew cylinder 11. The details of the pressure relief valve 41 are not shown since it may be of any conventional form such as a spring closed diaphragm, but it should be understood that no matter what form the valve 41 may have, it is set to open at an air pressure equal to the pressure required within the air cylinder 20 to assure the seating of stopper 15 upon the brew cylinder 11. While this pressure is a matter of design choice and depends on many other parameters of the system such as the size of the piston 21, the strength of the return spring 22, the size of the stopper 15, etc., for purposes of explaining the invention it may be assumed that a pressure of 30 pounds per square inch is required within the cylinder 20 in order to properly seat the stopper. Under such circumstances the pressure relief valve 41 would be designed to be unseated when a pressure in excess of 30 pounds per square inch is applied thereto. Thus, the operation of the air cylinder 20 is assured before the valve 41 will open to bleed air under pressure from the air cylinder 20 to the coffee brew cylinder 11.

If a pressure of as high as 30 pounds per square inch is admitted to the coffee brew cylinder 11, the stopper 15 might become unseated and also the brewed coffee would be forced through the filter screen 13 much too quickly for good extraction and desired coffee flavor. Therefore in order to reduce the pressure within the brew cylinder 11 during the brewing portion of the brew cycle, this invention provides for a second pressure relief valve 42 to be connected to the bore 40 at a point intermediate the first valve 41 and the stopper 15. Thus the buildup of pressure within the brew cylinder 11 may be predetermined not to exceed the setting of the second pressure relief valve 42 which incidentally may be of any suitable conventional construction.

In a preferred form of the invention, the second pressure relief valve 42 may be adjustable so that an adjustable range of air pressure within the brew cylinder during the brewing portion of the brew cycle may be predetermined. For example if the second pressure relief valve 42 is adjusted to open for an air pressure in excess of 3 pounds per square inch, then only a pressure of 3 pounds per square inch will be maintained in the brew cylinder 11 which will result in a relatively slow flow of brewed coffee through the filter screen 13 thus resulting in a storing flavor of brewed coffee. If on the other hand a weaker flavor of brewed coffee is desired, the second pressure relief valve 42 could be readjusted to open at a pressure of say 7 pounds per square inch which would thus maintain such pressure within the brew cylinder and cause the brewed coffee to flow at a faster rate through the filter screen 13. Obviously, the size of the openings of the filter screen 13 and the type of coffee grind are other factors which, together with the air pressure, determine the rate of extraction of brewed coffee through the screen.

The advantages of the pressurizing arrangement of the invention should now be readily apparent. However, it is desired to point out that one particular advantage of this arrangement is the accessibility of the adjustable pressure relief valve 42 which enables the operation of the air operated brewer to be easily adjusted and controlled by the serviceman, during actual operation of a brew cycle. Also, the pressurizing arrangement of the invention makes use of the same air in the air cylinder 20 that is supplied thereto by the single air control valve 32 operated by the cycle timer switch 35 so that additional control valves and timing switches are not required.

Various modifications will occur to those skilled in the art.

I claim as my invention:

1. An air operated coffee brewer of the type having a brew cup and a stopper movable into sealing relation with an upper open end of the brew cup during a brew cycle so that air under pressure may be introduced into the brew cup to force brewed coffee through a screen to a coffee outlet at the lower end of the brew cylinder, an air cylinder having a piston and rod connected to said stopper for moving the stopper into sealing relation with the brew cup during the brew cycle, and means for supplying air under pressure to the interior of said brew cup while said stopper is in the sealing relation comprising, an axial bore through said piston, rod and stopper, a first pressure relief valve in said bore operable to open for a pressure in said cylinder equal to the amount required to seat the stopper in sealing relation on the upper open end of said brew cylinder, and a second pressure relief valve connecting said bore to the atmosphere at a point intermediate said first valve and said stopper, said second pressure relief valve being operable to prevent the air pressure in said brew cylinder during the brew time of the brew cycle from exceeding a predetermined amount less than the pressure in said air cylinder.

2. The invention of claim 1 in which said second pressure relief valve is adjustable to predetermine the maximum air pressure in said brew cylinder and thus control the speed of the extraction of brewed coffee through said filter screen and control the flavor of the coffee.

References Cited

UNITED STATES PATENTS

| | | | |
|---|---|---|---|
| 3,426,670 | 2/1969 | Wittern | 99—283 |
| 3,349,690 | 10/1967 | Heier | 99—302 X |
| 3,369,478 | 2/1968 | Black | 99—302 |

ROBERT W. JENKINS, Primary Examiner